Sept. 16, 1924.

E. E. BIDWELL

ICE CREAM SCOOP

Filed Oct. 2, 1923

INVENTOR.
Earl E. Bidwell
BY
Philip A. Ferrell
ATTORNEY.

Sept. 16, 1924.

E. E. BIDWELL

ICE CREAM SCOOP

Filed Oct. 2, 1923

INVENTOR.
Earl E. Bidwell
BY
Philip A. Ferrell
ATTORNEY.

Patented Sept. 16, 1924.

1,508,915

UNITED STATES PATENT OFFICE.

EARL E. BIDWELL, OF OMAHA, NEBRASKA.

ICE-CREAM SCOOP.

Application filed October 2, 1923. Serial No. 666,110.

*To all whom it may concern:*

Be it known that EARL E. BIDWELL, a citizen of the United States, residing at Omaha, in the county of Douglas and State of Nebraska, has invented certain new and useful Improvements in Ice-Cream Scoops, of which the following is a specification, reference being had therein to the accompanying drawings.

The invention relates to ice cream scoops, of the type wherein a semispherical bowl is used and a rotatable semicircular scraping element for disloding ice cream from the bowl, and has for its object to provide a device of this character with means whereby, after a dipping operation, the top of the ice cream may be cut off even with the top of the bowl for insuring dispensing of ice cream in equal amounts and in predetermined quantities, thereby obviating the present difficulty where either too much or too little ice cream is dispensed with devices of this character.

A further object is to provide the handle of the ice cream scoop with a bracket in which the shaft is slidably mounted having a transverse cutter blade in a plane adjacent the plane of the open end of the bowl of the scoop and to provide finger engaging lever means adjacent the hand grip of the handle for forcing said rod and scraper blade forwardly across the open end of the bowl. Also to provide spring means for returning the scraper to inoperative position after each scraping and striking off operation.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1:
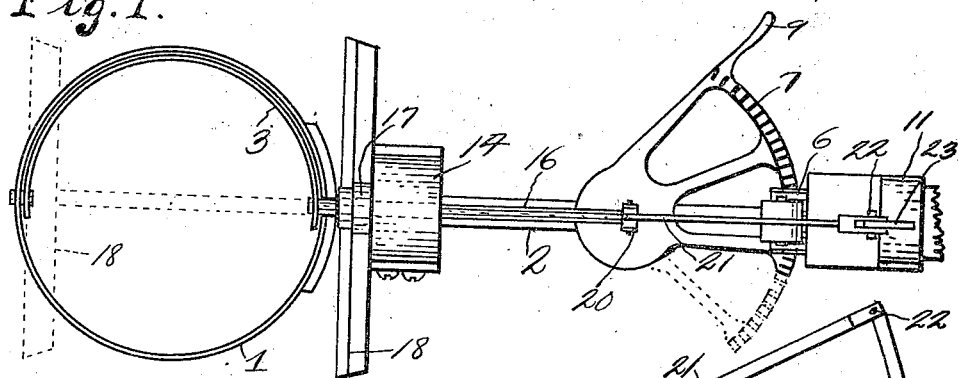
Figure 1 is a top plan view of a conventional form of ice cream scoop, showing the striking off mechanism applied thereto.
Figure 2:
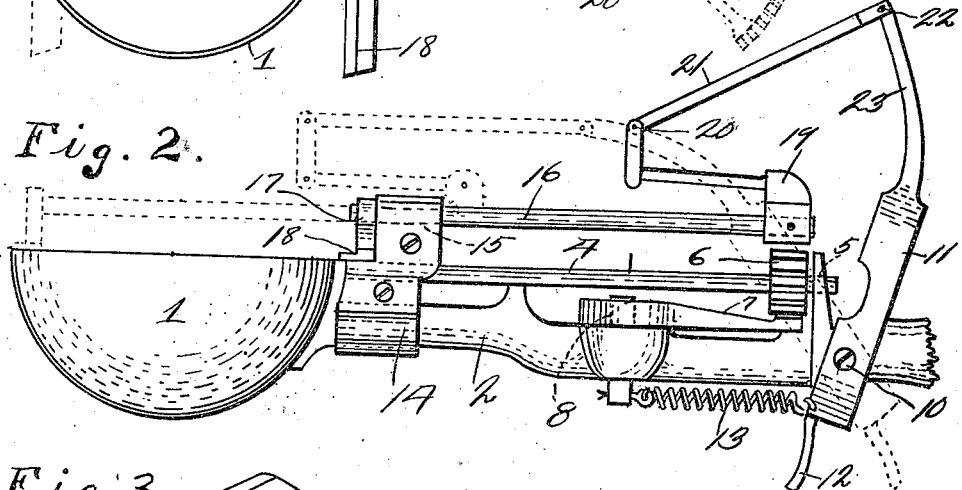
Figure 2 is a side elevation of the scoop.
Figure 3:
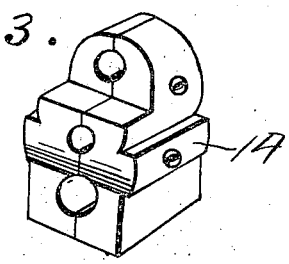
Figure 3 is a perspective view of the slide rod supporting bracket.
Figure 4:
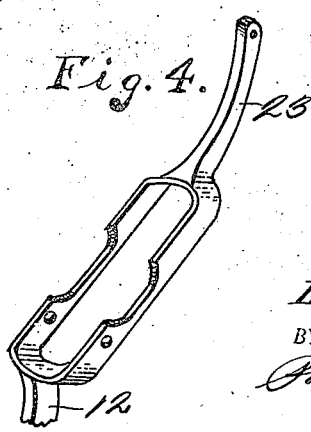
Figure 4 is a perspective view of the pivoted operating lever of the striking off mechanism.

Referring to the drawing, the numeral 1 designates the semispherical bowl of the ice cream scoop and 2 an elongated handle carried thereby. Disposed within the bowl 1 is a segmentally shaped scraper which when rotated one hundred and eight degrees dislodges the ice cream within the bowl and allows the same to be easily deposited in an ice cream cone or in a glass. The scraper 3 is carried by a rearwardly extending shaft 4 disposed above the handle 2 and which shaft has its rear end rotatably mounted in a bearing 5 adjacent the rear end of the handle. Secured to the rear end of the shaft 4 is a gear 6, with which gear a gear segment 7 meshes, which segment is pivotally mounted at 8 on the handle 2. It will be seen that when the operator places his finger on the finger engaging member 9 and rotates the gear segment 7, the shaft 4 will be rotated and the scraper 3 will also be rotated and the ice cream dislodged from the bowl 1. The above mechanism is well known in ice cream scoops as at present constructed, however no means is provided whereby a uniform amount of ice cream may be dispensed from scoops of this character as there is usually too much or too little in the scoop, which either entails a loss for the purchaser or dispenser. To obviate this difficulty the handle member 2 has pivotally connected thereto at 10 a yoke 11, which extends at an angle to the handle 2 and has one of its ends provided with a finger engaging member 12, whereby the yoke may be rocked by the operator against the action of the spring 13, which spring forms means for returning the mechanism hereinafter set forth to normal inoperative position after each operation thereof. Clamped on the handle member 2 adjacent the bowl 1 is a separable bracket 14, which bracket adjacent its upper end is provided with a bearing 15, in which bearing is slidably mounted a shaft 16. Shaft 16 is preferably in parallel relation to the shaft 4 and the handle 2 and has its inner end provided with a downwardly extending bracket 17, which bracket terminates in a transversely disposed striking off blade 18 in a plane adjacent the open end of the bowl 1. It will be seen that when the blade 18 is forced across the bowl 1 to the dotted line position shown in Figure 2, excess ice cream will be struck from the bowl, and a uniform amount of ice cream may be dispensed from the bowl, thereby insuring the delivery of exact quantities of ice cream to various customers. Secured to the rear end of the slidable shaft 16 is a rigid bracket 19, to which is pivotally connected at 20 a rearwardly and upwardly extending connecting rod 21, which rod is pivotally connected at 22 to a curved arm 23 carried by the yoke 11, therefore it will be seen that when the operator rocks the yoke 11 the slide shaft 16 will be forced forwardly across the bowl 1, and when the operator releases the finger engaging member 12, the coiled spring 13 will return the blade 18 to the full line position shown in Figure 2.

Figure 5:
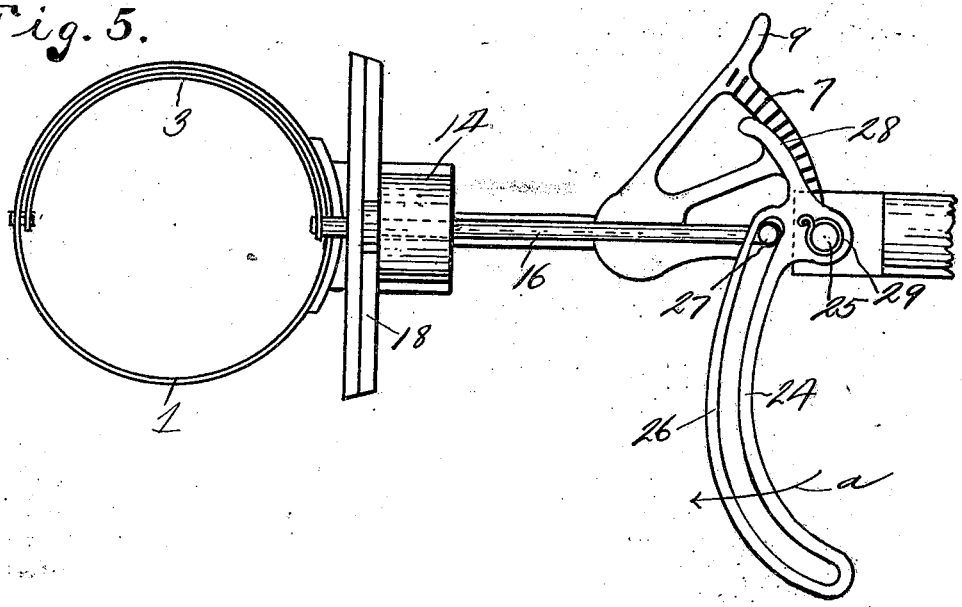
Figure 5 is a top plan view of a scoop showing a modified form of striking off mechanism.
Figure 6:
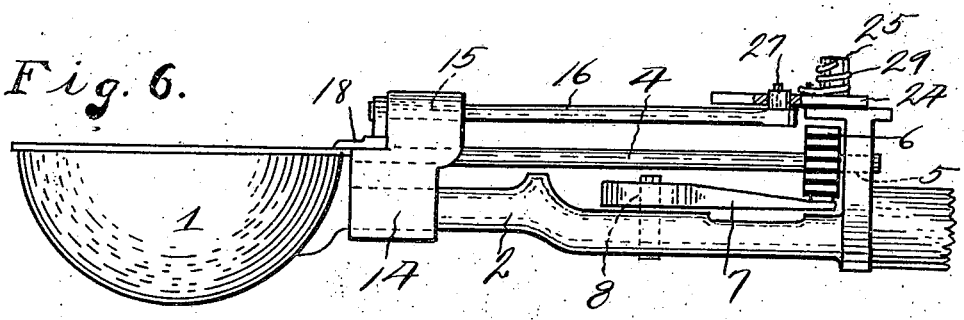
Figure 6 is a side elevation of the device shown in Figure 5.

Referring to Figures 5 and 6 wherein a modified form is shown, the construction is substantially the same with the exception that a horizontally disposed pivoted cam member 24 is provided, which member is pivotally mounted on a post 25 and is provided with an arcuate slot 26, which receives a lug 27 carried by the slide shaft 16. The cam 24 is provided at one of its ends with a finger engaging member 28 whereby the cam will be rocked on its pivotal point against the action of the coiled spring 29, which coiled spring returns the cam to normal position when released by the operator. When the cam is moved in the direction of the arrow $a$ the slide shaft 16 is forced across the bowl 1 and consequently the knife 18 will strike off the excess ice cream in the bowl, and when the cam is released the cam slot 26 will cause the shaft to move rearwardly to the full line position shown in Figure 5.

From the above it will be seen that a striking off device is provided for an ice cream scoop whereby a uniform amount of ice cream may be easily and quickly dispensed to purchasers, and that the device may be used in connection with a conventional form of ice cream scoop.

The invention having been set forth what is claimed as new and useful is:—

1. The combination with an ice cream scoop having a handle, a bowl carried by said handle, of a striking off device for said bowl, said device comprising a bracket disposed on the handle adjacent the bowl, a shaft slidably mounted in a bearing of said bracket, a transversely disposed knife carried by the forward end of said shaft adapted to be moved across the bowl and means disposed adjacent the rear end of the handle for moving said shaft across the bowl and returning the shaft and knife to normal position.

2. The combination with an ice cream scoop comprising a bowl, a handle carried by said bowl, of a striking off device for said bowl, said device comprising a bracket carried by the handle adjacent the bowl, a shaft slidably mounted in said bracket, a transversely disposed knife carried by said shaft forwardly of the bracket, a member pivoted adjacent the rear end of the handle, link connections between said member and the rear end of the shaft at one side of the handle, and spring means connected to said pivoted member and to the handle and forming means for returning the knife and shaft to inoperative position after a striking off operation.

3. The combination with an ice cream scoop comprising a bowl, a handle member carried by said bowl, a rotatable scraper shaft extending into the bowl, of a striking off device for said bowl, said device comprising a separable bracket carried by the handle member adjacent the bowl, said rotatable scraper shaft extending through a bearing in the bracket, a shaft slidably mounted in a bearing of the upper end of the bracket, a knife carried by said shaft adjacent the bowl, a yoke pivotally mounted adjacent the rear end of the handle member, link connections between the yoke and the rear end of the slidable shaft, spring means for normally returning said yoke to inoperative position, said yoke forming means when rocked for moving the knife across the bowl.

In testimony whereof I hereunto affix my signature.

EARL E. BIDWELL.